J. E. ANGELL.
WATER PURIFIER AND CLARIFIER.
APPLICATION FILED APR. 27, 1906. RENEWED FEB. 24, 1908.
961,091.
Patented June 14, 1910.
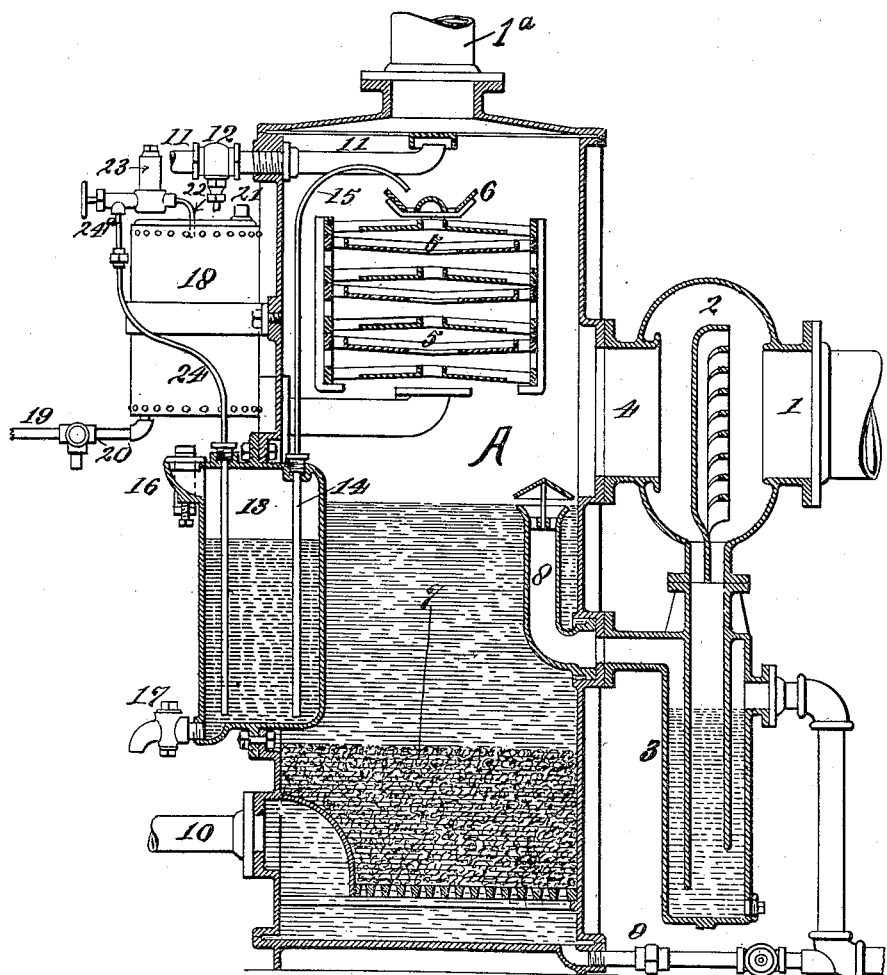

UNITED STATES PATENT OFFICE.

JOHN E. ANGELL, OF ST. LOUIS, MISSOURI.

WATER PURIFIER AND CLARIFIER.

961,091. Specification of Letters Patent. Patented June 14, 1910.

Application filed April 27, 1906, Serial No. 314,068. Renewed February 24, 1908. Serial No. 417,452.

*To all whom it may concern:*

Be it known that I, JOHN E. ANGELL, a citizen of the United States, residing in St. Louis and State of Missouri, have invented a new and useful Improvement in Water Purifiers and Clarifiers, of which the following is a specification.

This invention relates to water purifiers such as are used to purify water for steam generation; and it consists of the novel construction, combination and arrangement of parts herein shown, described and claimed.

One object of my invention is to produce a compact and highly efficient apparatus of the character referred to, comprising a feed-water heater having the usual steam inlet and outlet passages, a reagent or chemical tank supported in proximity to the heater and exposed or subject to the temperature thereof, connections for supplying water into the heater, and means for injecting the requisite amount of the reagent into the stream of incoming water, and means for causing the water and reagent to become thoroughly and evenly mixed in order to cause efficient coagulation or aggroupment of the impurities in the water.

Another object is to provide a tank adapted to contain a chemical reagent in solution, in combination with means for admitting air or gas pressure into the chemical tank to eject the reagent therefrom and into the water entering the heater and to maintain the reagent of unvarying and uniform density and in a state of constant agitation to prevent crystallization or deterioration thereof.

There are other objects and advantages of my invention which will be obvious to those skilled in the art to which this invention appertains, reference being made to the accompanying drawing which illustrates my invention in connection with an open heater.

Referring to the features comprised in the embodiment illustrated, A indicates a feed-water heater to which steam is admitted through a pipe 1, a steam and oil separator 2, and a connecting passage 4. A trap 3 is arranged in connection with the separator to receive and discharge the separated oil and water. A pipe 1ª serves as an outlet for the exhaust steam.

Within the heater A are a multiplicity of trays 5 arranged in the path of the passing steam and entirely exposed thereto so that they are kept at the same temperature as the steam. A distributing trough 6 is mounted above the trays 5 to receive the feed-water charged with the chemical reagent and cause mixture and distribution thereof on the trays, whence it flows and is eventually deposited in the bottom of the heater upon a filter bed 7. An overflow pipe 8 leads from the trap 3 into the heater and is provided with an open upper end, thereby determining the altitude to which the water in the heater may rise. The filter bed 7 is arranged some distance above the bottom of the heater, thereby forming a chamber which receives the purified water which percolates through the filter bed. A pipe 10 leads from the purified water chamber to the boiler or other destination. A valve controlled pipe 9 leads from the bottom of the purified water chamber and affords convenient means for drawing off any amount of water as desired.

A feed-water pipe 11 leads into the heater near the top and terminates immediately above the distributing trough 6 into which the water is discharged. A valve 12 is located at a convenient position on the pipe 11 and affords means to regulate the amount of water admitted into the heater. The pipe 11 discharges the water near the outlet pipe 1ª into the heated trough 6 from which it flows, exposed to the steam, onto the trays 5 against and around which the steam circulates as it passes toward the outlet.

13 indicates the chemical reagent tank which is located in an opening in the wall of the heater, and which extends a considerable distance into the heater and being, for the most part, below the maximum water level, so that the contents of the tank will be kept at about the same temperature as the heater water. A feed pipe 14 extends from a point near the bottom of the tank through the top thereof into the heater A and is provided with a lateral extension 15 on its upper end which delivers the chemical reagent into the distributing trough 6 where it combines with the feed-water. An opening 16 is provided whereby the reagent may be introduced into the tank, said opening being provided with suitable means for closing the same. Any preferred reagent may be utilized in this apparatus, and if the powdered form is used a sufficient quantity of water to dissolve it is mixed therewith in the tank 13. A valve 17 communicates with the bottom of the tank 13 and may be used to draw off all the contents for the purpose of cleaning the tank or other purposes.

A pressure tank 18 is secured in some suitable manner to the heater A. A charging or pressure supply pipe 19 leads into the tank 18. A valve 20 is located at a convenient position in said pipe, and is operable to admit or discharge the pressure, or to prevent admission thereof into the tanks. A check valve 21, of ordinary construction, is arranged in the top of the tank 18 and may be opened to admit air into the tank when the latter is being emptied. A pipe 22 extends into the tank 18 and supports a pressure reducing valve 23, of any of the well known types, whereby the pressure in the tank may be reduced and maintained at the lower degree regardless of the pressure entering the tank. A pipe 24 leads from the valve 23 through the top of the tank 13 and terminates near the bottom of said tank. The pressure thus admitted from the tank 18 into the tank 13 may be regulated by a valve 24ª located at a desirable position on the pipe 24.

In operation the chemical reagent is introduced into the tank 13, and the pressure tank 18 is properly charged, the degree of pressure therein being regulated by the valve 23. The valve 24ª is then opened to admit pressure into the tank 13. The admission of pressure into the liquefied reagent causes agitation thereof to such an extent as to prevent crystallization and to maintain the same of uniform and unvarying density, and, at the same time, discharges a quantity of the reagent through the pipe 14 into the water distributing trough 6. The pressure thus admitted into the tank 13 overcomes the opposing pressure from the heater so that the required amount of the reagent will inevitably be supplied, assuming that the various valves are properly adjusted.

I am aware that the tanks may be located in various other relative positions than those shown in the present embodiment of my invention, and that there may be variations in the construction and arrangement of the parts without in the least departing from the spirit and scope of my invention. I do not limit myself to the specific features and arrangement shown, but

What I claim and desire to secure by Letters Patent is—

1. In a feed water heater, a tank containing a chemical reagent, said tank being exposed to the heating agent within said heater, and means for conveying the contents of said chemical tank, and discharging same into the incoming water.

2. In a feed water heater, having a tank containing a chemical reagent, said tank being exposed to a heating medium within the heater, and a discharge pipe from said chemical tank, located within the heater and adapted to deliver said reagent into the incoming water.

3. In a feed water heater, having a tank contacted with a heating medium within the heater, a discharge pipe connected with said tank, and means whereby pressure is exerted upon the chemical within the tank to discharge the same therefrom.

4. In a feed water heater having a tank and a discharge pipe, both exposed to the heating medium within the heater, a source of fluid pressure, and means connecting the source of fluid pressure, and the chemical tank whereby pressure is exerted to discharge the liquid from the last mentioned tank.

5. In a water purifying system, consisting of a feed water heater a chemical tank attached to said heater exposed to heat, a pipe leading therefrom to deliver a chemical reagent into the incoming water, fluid pressure having communication with the chemical tank, and means for controlling the admission of fluid pressure to the chemical tank.

6. In a water purifying system consisting of a feed water heater, a chemical tank attached to said heater, a discharge pipe connected therewith, and exposed to the temperature of the heater, a fluid pressure tank, means for controlling the pressure of fluid from said tank, and means for controlling the quantity of flow, and connecting means between the fluid pressure and chemical tank.

7. In a water purifying system, consisting of a feed water heater, a chemical tank attached to said heater and discharge pipe connected thereto, and exposed to the temperature of the feed water heater, a tank containing fluid under pressure, connecting means between said fluid and chemical tank, and means for charging the fluid pressure tank.

8. In a water purifying system, consisting of a heater a chemical tank attached to said heater, a discharge pipe connected thereto and exposed to heat, and means whereby a fixed and predetermined fluid pressure may be attained, to discharge the contents of the chemical tank into the incoming feed water.

9. A water purifier comprising a heater, a series of trays within the heater, a tank containing a chemical reagent extending into the heater, means for admitting water into the heater, and means for conveying the chemical reagent into the incoming water, substantially as specified.

10. In a water purifier, a heater, means for supplying water into said heater, a tank containing a chemical reagent, said tank having one wall in contact with the contents of the heater, and means for admitting air under pressure into said tank effectively to agitate the contents thereof and also to eject the contents, substantially as specified.

11. In a water purifier, a heater, a multiplicity of trays therein, a chemical tank extending into the heater and exposed to heat, a pipe leading therefrom into the heater, a pressure tank communicating with the chemical tank, and means for controlling the pressure into the chemical tank, substantially as specified.

12. In a water purifier, a heater, a tank positioned so that a portion of its wall will contact with and be heated by the heating medium of the heater, means for agitating the contents of said tank, means for conveying the contents of said tank into the heater, means for supplying water into the heater, a distributing trough to receive the contents of said tank and the water, and a series of trays over which the said elements flow after leaving the distributing trough, substantially as specified.

13. In a water purifier, a heater, a tank arranged to contain a chemical reagent and having one wall thereof forming part of the wall of the heater whereby the contents of the said tank will be maintained in substantially the same thermic condition as the contents of the heater, and an air pressure device arranged to agitate and eject the contents of said tank, substantially as specified.

JOHN E. ANGELL.

Witnesses:
CHARLES PICKLES,
L. E. LEE.